(12) United States Patent
Hui et al.

(10) Patent No.: US 6,439,048 B1
(45) Date of Patent: Aug. 27, 2002

(54) IN-FLIGHT CALIBRATION OF AIR DATA SYSTEMS USING A NOSE-MASK SENSOR

(75) Inventors: Kenneth Hui; Dave Collins, both of Ottawa (CA)

(73) Assignee: National Research Council, Ottawa (CA)

( * ) Notice: Subject to any disclaimer, the term of this patent is extended or adjusted under 35 U.S.C. 154(b) by 56 days.

(21) Appl. No.: 09/671,136

(22) Filed: Sep. 28, 2000

(51) Int. Cl.$^7$ ................................................ G01C 21/00
(52) U.S. Cl. ......................................................... 73/181
(58) Field of Search ........................ 73/180, 181, 182, 73/170.01, 170.02, 170.07, 861.65, 861.66, 861.67, 861.68; 244/3.16, 3.17, 3.18, 177 A, 130

(56) References Cited

U.S. PATENT DOCUMENTS

| | | | |
|---|---|---|---|
| 3,616,140 A | 10/1971 | Copeland et al. | 161/68 |
| 4,850,275 A * | 7/1989 | Utreja et al. | 244/3.16 |
| 5,025,661 A * | 6/1991 | McCormack | 73/180 |
| 5,318,251 A | 6/1994 | Bergh | 244/121 |
| 5,544,526 A | 8/1996 | Baltins et al. | 73/180 |
| 5,847,289 A | 12/1998 | Lehnen | 73/862.381 |
| 6,038,932 A | 3/2000 | Wandel et al. | 73/861.65 |

* cited by examiner

*Primary Examiner*—William Oen
(74) *Attorney, Agent, or Firm*—Paul S. Sharpe; Marks & Clerk

(57) ABSTRACT

A nose cone overlay for determining air data quantities. The overlay is adapted for removable mounting to a conventional radome or nose cone of a typical aircraft. The overlay includes transducers for measuring data with respect to pressure from which quantities of the aircraft such as angles of attack, side slip are derived, which quantities are transmitted wirelessly to the interior of the cabin or a secondary location.

20 Claims, 2 Drawing Sheets

IN-FLIGHT CALIBRATION OF AIR DATA SYSTEMS USING A NOSE-MASK SENSOR

FIELD OF THE INVENTION

The present invention relates to an apparatus for receiving and analyzing air data quantities and more particularly, the invention relates to an apparatus and method of use of the apparatus for determining, quantifying and analyzing air quantities in real time during a flight of the aircraft.

BACKGROUND OF THE INVENTION

In this area of technology, it is most desirable to have a technique for real time aerodynamic modeling of an aircraft. The technique, known as RAMI (Real-Time Aerodynamic Model Identification) as well as other aircraft modeling flight test programs require the measure of aircraft airflow angle such as the angles of attack and side slip. In the typical prior art, one of the more favored techniques for the measurement of these parameters relies on an externally mounted nose boom vanes or nose cone equipped with pressure sensors. These installations are time consuming and require actual hook ups with electrical wiring to the aircraft. In this manner, the aircraft ends up being modified to install the modeling equipment. This is obviously expensive and compromises the airworthiness of the aircraft in view of the fact that such modifications to the bulkhead, firewall and other critical components in the structure of the aircraft.

It would be desirable if there were assembly and a method using the assembly to determine selected air data quantities which did not require any modification of the aircraft or structural integrity compromise. The present invention seeks to solve this problem with a system that can be immediately instituted without any structural modification to the aircraft itself.

SUMMARY OF THE INVENTION

One object of the present invention is to provide an improved system and a method for determining air data quantities real time while the aircraft is in flight.

A further object of the present invention is to provide a nose cone overlay suitable for positioning on the nose cone of an aircraft for obtaining air data quantities, the nose cone having an interior and an exterior, comprising: a body for releaseable engagement with the nose cone, the body being independent of the interior of the nose cone, the body including: mounting means for releaseably mounting the body to the nose cone; a plurality of pressure transducers on the body for receiving air data quantities during flight of the aircraft; an electronic circuit connected to the pressure transducers on the body for processing received air data quantities during flight; a power source for supplying power to the electronic circuit; and a wireless transmitting means for transmitting received air data quantities to a central processing unit.

It has been found that the overlay is particularly useful for retro fit onto the nose cone of an aircraft. After extensive testing procedures and other airworthiness examinations, it was found that pressure sensitive adhesive could be employed to maintain the overlay on the nose cone under a variety of climatic conditions.

As a further advantage, the pressure transducers were found to be particularly useful when employed in the instant invention. It was also realized that the pressure transducers were particularly useful in acquiring the data required.

A further object of one embodiment of the present invention is to provide a nose cone assembly for positioning on an aircraft for obtaining air data quantities, the assembly comprising: a nose cone having an interior and an exterior; a self-contained overlay for releaseable engagement with the nose cone overlay being independent of the interior of the nose cone, the overlay including: mounting means for releaseably mounting the overlay to the nose cone; a plurality of pressure transducers on the overlay for receiving air quantities during flight of the aircraft; an electronic circuit connected to the pressure transducers in the overlay for processing received air data quantities during flight; a power source for providing power to the electronic circuit; and a wireless transmitting means for transmitting required air data quantities to a central processing unit.

One of the advantages of the present invention is that it can be easily installed and removed without any damage to the aircraft whatsoever. This is a marked improvement over what has been proposed in the prior art since prior art arrangements relied on extensive modifications of the aircraft, which in most case is brought into question the airworthiness of the aircraft after installation and subsequent removal. The present invention provides an expedited method and apparatus for determining real time data. Once the data has been collected, the overlay of the nose cone can simply be removed and the aircraft thus restored to its original pristine condition.

In accordance with a further object of one embodiment of the present invention there is provided a method of determining air data quantities such as pressure, angle of attack and side slip experienced by an aircraft during flight, comprising the steps of: providing a self-contained and removable nose cone assembly for mounting to a nose cone of an aircraft, the assembly having means for sensing and transmitting the air data quantities; providing a CPU located remotely from the assembly for receiving and analyzing transmitted air quantities; mounting the assembly to a nose cone of an aircraft; collecting the air quantity data; transmitting collected data to the CPU; and determining the air quantities.

Having thus described the invention, reference will now be made to the accompanying drawings illustrating preferred embodiments.

BRIEF DESCRIPTION OF THE DRAWINGS

Similar numerals in the figures denote similar elements.

DETAILED DESCRIPTION OF THE PREFERRED EMBODIMENTS

Figure 1:
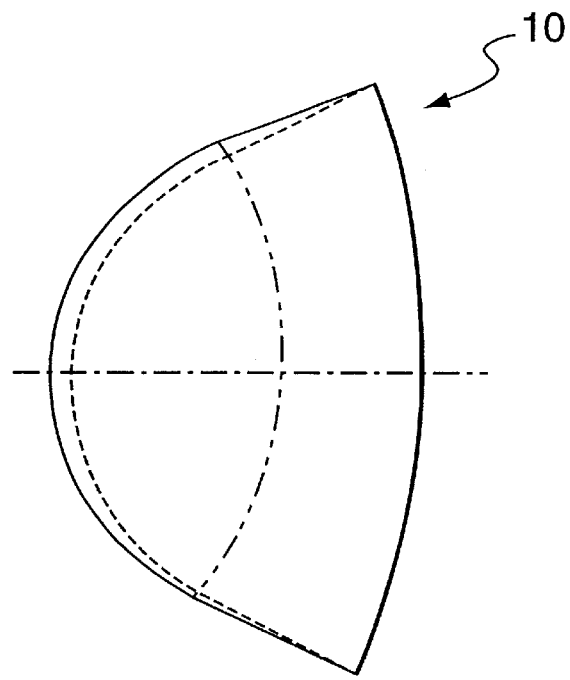
FIG. 1 is a side view of one embodiment of the present invention.

Referring now to FIG. 1, the overlay consists of a substantially hemispherical overall shape and is generally referenced by numeral 10 in the Figure. It has been found that composites are useful for the construction of the body and to this end, epoxy glass laminated over epoxy syntactic foam has been employed.

Figure 2:
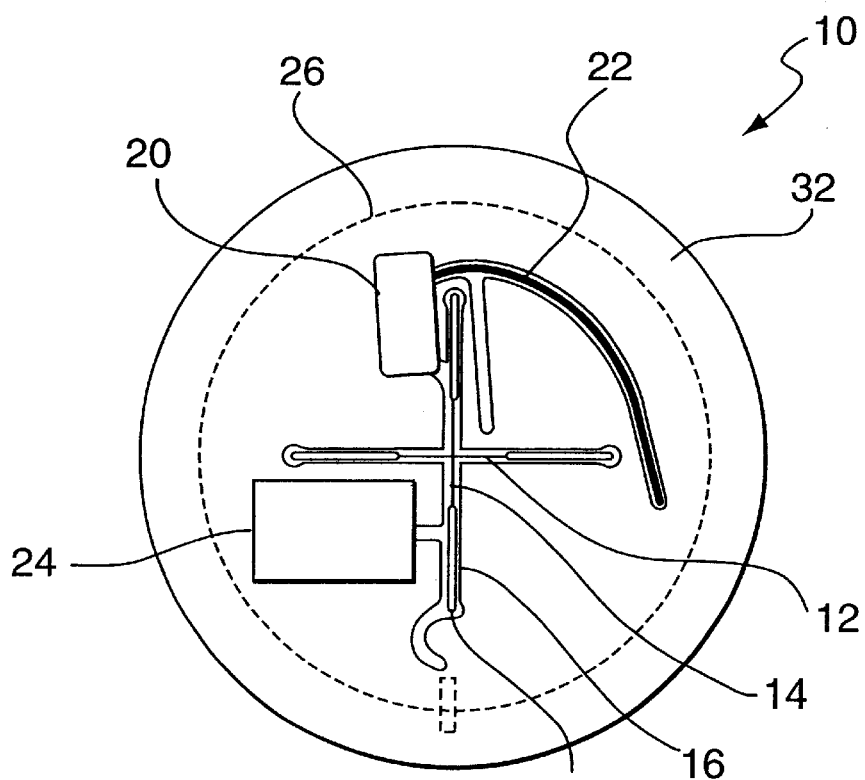
FIG. 2 is a front elevational view of the overlay of FIG. 1.

With reference now to FIG. 2, shown is a layout of the elements of the nose cone overlay 10. The differential pressure sensors 12 and 14 are disposed at 90° relative to one another are positioned within plastic tubing 16. At the terminal ends of the tubing there are included apertures 18 which communicate with the pressure sensors 12 and 14. The apertures penetrate the overlay so that air data can be transmitted from the exterior of the overlay 10 to the interior or more particularly, where the pressure tubing and pressure sensors are located.

An electronic module 20 is positioned adjacent the sensors and is also in communication with an antenna 22. A power source, in this case comprising a nickel metal hydride battery 24 provides power to the electronics and is connected therewith. The single broken line 26 is representative of the pressure sensitive contact adhesive which is affixed to the nose cone of a conventional aircraft.

Figure 3:
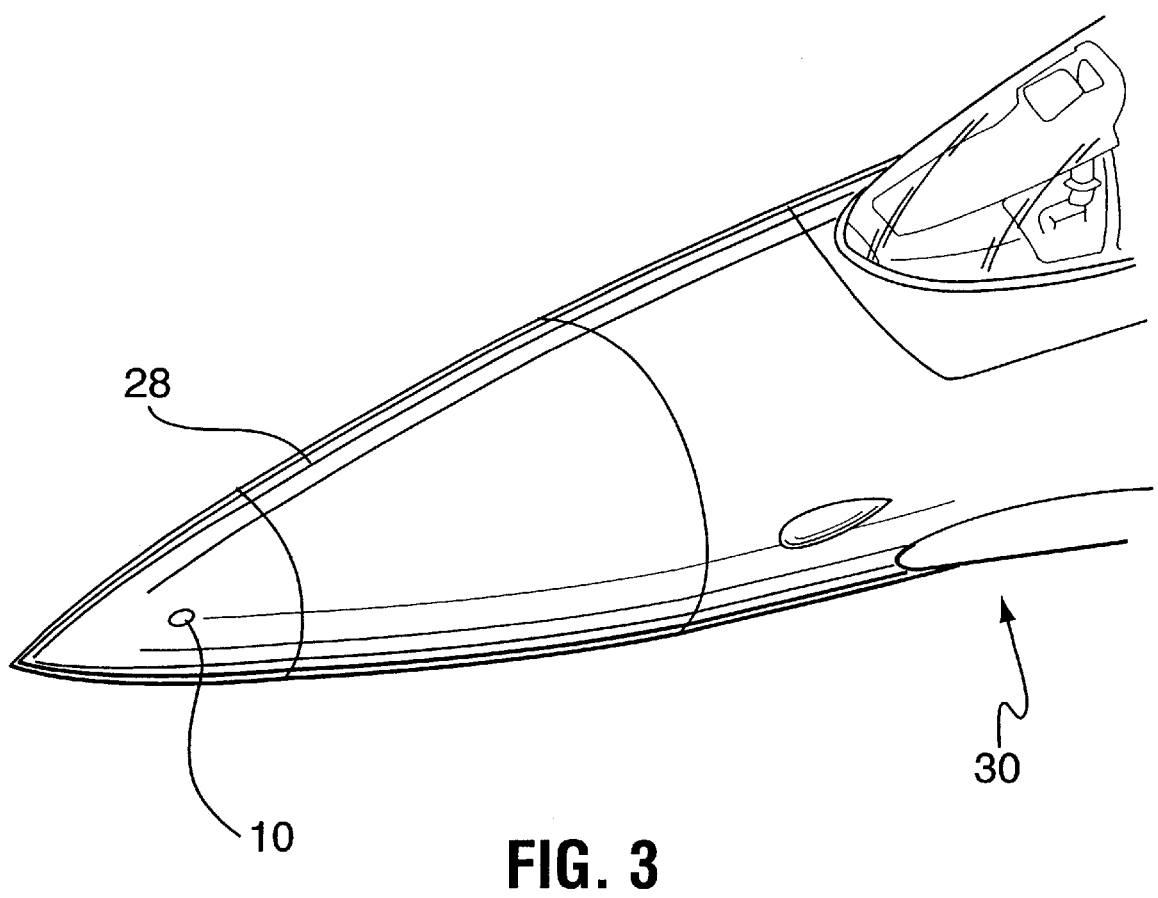
FIG. 3 is a perspective view of an aircraft with the overlay in-situ.

FIG. 3 illustrates the overlay 10 as positioned on nose cone 28 of aircraft 30.

The overlay 10 is entirely self-contained and the components, as set forth in FIG. 2, are embedded into the syntactic foam for protection. In this manner, the overlay acts as a self-contained unit which can be simply adhered to the nose cone as illustrated in FIG. 3 without compromising the structural integrity of the nose cone. By virtue of the antenna, the data received by way of the activation of the pressure sensors 12 and 14 is transmitted to a conventional CPU (not shown) which may be onboard the aircraft 30 or at a more remote location. Where the location is quite remote, it will be understood that the components in FIG. 2 will also include an amplifier to amplify the transmitted signal to the CPU.

The overlay 10 preferably also includes a flexible urethane skirt, which skirt is represented by numeral 32 in FIG. 2. The skirt is founded by the broken line 26 denoting the adhesive material to the most extreme parameter of the overlay 10. The detected air data quantities received are transmitted by a short range RF link (positioned in the electronics module 20) at 418 MHz to a receiver possessing nose rejection capabilities in the aircraft cabin. The receiver is not shown in the drawings. The battery 24 within the overlay 10 provides operation within the temperature range of −40° C. to +50° C. The battery of choice was a nickel metal hydride battery with 450 mAH power rating which provided sufficient power for 15 hours of continuous operation at −20° C.

As an alternative, the transmission may be achieved by VHF, optical or other suitable wireless means.

The pressure transducers were found to produce a static accuracy equivalent of 0.2° angles of attack and side slip.

Having thus described the invention, reference will now be made to the test data obtained during testing of the arrangement.

Test Results

For the purpose of the tests, the aircraft tested was a C-FNRC-Convair Model 440 (580). The tests conducted were to examine the adhesive strength properties at cold temperatures, evaluate pressure effects at altitude, and perform endurance flight-tests on the Convair 580, before the RAMI mask was installed and flown on the Falcon 20 aircraft.

The following equipment was utilized:
(I) Hunter Spring—Mechanical Force Gage Model #D-100-M, Serial Number 737.
(II) Vacuum Chamber—Flight Research Laboratory (Purpose-built test chamber).
(III) Food Freezer—"The Stapper Residence" (Temperature set to −20° C.).

Cold Temperature Test 1
(Pull-Test Coupon)

The strength properties of the adhesive (acrylic) tape used to secure the endurance test article and RAMI mask to their respective aircraft test locations, are not well documented at cold temperatures. Cold-soak during climb to altitude may cause a reduction in adhesive strength.

A representative test coupon (See Test 2 for details of the urethane/glass composite) was bonded to a piece of acrylic plastic sheet, using a 3.5-inch (long)×0.5-inch (wide) strip of adhesive tape. This coupon was chilled in a freezer to a temperature of about −20° C., and left to stabilize for about 1 hour.

Immediately after removal from the freezer, the coupon was pull-tested to 80 pounds shear strength, using a Hunter Spring—mechanical force gage. The applied shear load was cycled from zero to 80 pounds (six times), before the adhesive failed under load.

Careful examination showed the coupon failure was characterized by a ripped film carrier with evidence of adhesive still remaining attached to the acrylic and urethane/glass composite sheets.

Although it is possible for an aircraft (at altitude) to reach temperatures much colder than tested here, this (limited) test is sufficient to demonstrate the adhesive tape is strong enough to carry the expected aerodynamic (and inertia) loads, down to −20° C.

Urethane/Epoxy Composite (Test Coupon)
Failure load (in shear) $P_{ult}=80$ $lbs_{f(ult)}$
Area of adhesive tape (test coupon) $A_{tape}=[3.5\ in]\times[0.5\ in]=1.75\ in^2$
Ultimate shear strength (−20° C.)
$$\sigma_{su}=[P_{ult}]/[A_{tape}]=[80\ lbs_f]/[1.75\ in^2]$$
$$=45.7\ psi_{(ult)}$$

Cold Temperature Test 2
(Endurance Test Article)

The prototype test article was designed, manufactured and installed at room temperature. Cold-soak during flight tests could cause the mask to shrink (due to the different thermal expansion coefficients), which might pull the mask off the adhesive mounting tape, or minimize the contact area. Room-temperature adhesive strength properties may also be different at below-freezing temperatures.

The endurance test article was manufactured from a epoxy/glass and epoxy/urethane composite. The outer skin was formed on a 5-inch diameter ball, while the inner skin was manufactured to fit the 9-inch nose-cap of the Convair 580 (starboard) wing-tip boom.

The endurance test article was placed inside a freezer, and chilled overnight to −20° C. It was removed the next day, visually inspected and showed no evidence of shrinkage/cracking of the flexible urethane skirt, or loss of adhesive strength.

Vacuum Chamber, Altitude Test 3
(Endurance Test Article)

The endurance test article was designed, manufactured and installed at sea-level altitude, and at room temperature. During climb to altitude there is a resultant drop in atmospheric pressure, and any air trapped underneath the mask could expand and push the device off the Convair 580, wing-tip boom, nose-cap.

The endurance test article (and the nose-cap from the wing-tip boom), were placed inside a vacuum chamber, and depressurized to 7 inches (absolute), or about 23 inches (below gauge) of Hg (mercury)—an ICAO standard atmosphere equivalent of about 35,000 feet altitude. It was then visually inspected for bubbling, cracking, or adhesive failure. There were no noticeable changes, and a manual adhesion check was performed. A small vent path was later provided as an added precaution.

Convair 580 Flight—Test 4
(Endurance Test Article)

Before the RAMI mask was permitted to fly on the nose of the Falcon 20, some type of endurance testing was required to demonstrate long-term adhesive strength properties, under actual aircraft test conditions of temperature, sunlight, altitude, and wind-blast exposure. Since the actual RAMI mask is expected to be test flown for 1 or 2 hours, then 10–20 hours of endurance testing provided an added level of safety.

The prototype endurance test article (supra) was designed, manufactured, and mounted to the nose-cap on the starboard-side wing-tip boom. This location was selected, in the unlikely event that the device separated in-flight. The trajectory of the departing unit would clear the propellers, engines, and tail surfaces of the aircraft.

The endurance test article has successfully flown aboard C-FNRC for a total of 17.3 hours. There was no physical deterioration or loss of adhesive strength, and the test article has experienced airspeeds of 123 m/sec (239 KIAS), outside air temperatures (OAT) as low as −37.6° C. (−35.7° F.), and altitudes up to 7094 m (23,000 ft).

SUMMARY

The pull-tests on the adhesive tape, used to mount the Convair 580 endurance test article, demonstrated shear-strengths adequate to carry all expected flight and landing loads, down to temperatures as low as −20° C.

The endurance test article did not display evidence of shrinkage, or cracking when chilled to −20° C. overnight. The overlap area between the adhesive tape and the urethane lip was not affected by this test.

The endurance test article did not bubble, or lose adhesive strength when depressurized in a vacuum chamber to the equivalent of 35,000-ft altitude.

The endurance test article has logged 17.3 hours of flight-testing on the Convair 580, reaching airspeeds of 123 m/sec (239 KIAS), outside air temperatures (OAT) as low as −37.6° C. (−35.7° F.) and altitudes as high as 7094 m (23,000 ft).

Although embodiments of the invention have been described above, it is not limited thereto and it will be apparent to those skilled in the art that numerous modifications form part of the present invention insofar as they do not depart from the spirit, nature and scope of the claimed and described invention.

We claim:

1. A nose cone overlay suitable for positioning on the nose cone of an aircraft for obtaining air data quantities, said nose cone having an interior and an exterior, comprising:
   a body for releaseable engagement with said nose cone, said body being independent of said interior of said nose cone, said body including:
      mounting means for releaseably mounting said body to said nose cone;
      a plurality of pressure transducers on said body for receiving air data quantities during flight of said aircraft;
      an electronic circuit connected to said pressure transducers on said body for processing received air data quantities during flight;
      a power source for supplying power to said electronic circuit; and
      a wireless transmitting means for transmitting received air data quantities to a central processing unit.

2. The nose cone overlay as set forth in claim 1, wherein said CPU is remotely located and independent of said body.

3. The nose cone overlay as set forth in claim 2, wherein said CPU receives and analyzes transmitted data for determining air data quantities.

4. The nose cone overlay as set forth in claim 1, wherein said body includes a plurality of apertures adjacent said pressure transducers.

5. The nose cone overlay as set forth in claim 1, wherein said assembly is a wireless assembly.

6. The nose cone overlay as set forth in claim 1, wherein said body comprises a substantially hemispherical body.

7. The nose cone overlay as set forth in claim 6, wherein said body includes an epoxy glass laminated on an epoxy foam.

8. The nose cone overlay as set forth in claim 7, wherein said foam is syntactic.

9. The nose cone overlay as set forth in claim 8, wherein said body further includes a rubber skirt.

10. The nose cone overlay as set forth in claim 1, wherein said mounting means comprises pressure sensitive adhesive.

11. The nose cone overlay as set forth in claim 1, wherein said pressure transducers comprise a piezoresistive differential pressure transducers.

12. The assembly as set forth in claim 1, in combination with a nose cone of an aircraft.

13. A nose cone assembly for positioning on an aircraft for obtaining air data quantities, said assembly comprising:
   a nose cone having an interior and exterior;
   a self-contained overlay for releaseable engagement with said nose cone overlay being independent of said interior of said nose cone, said overlay including:
      mounting means for releaseably mounting said overlay to said nose cone;
      a plurality of pressure transducers on said overlay for receiving air quantities during flight of said aircraft;
      an electronic circuit connected to said pressure transducers in said overlay for processing received air data quantities during flight;
      a power source for providing power to said electronic circuit; and
      a wireless transmitting means for transmitting required air data quantities to a central processing unit.

14. The nose cone assembly as set forth in claim 13, further including a CPU for receiving and analyzing transmitted data whereby said air quantities may be determined.

15. The nose cone assembly as set forth in claim 13, wherein said overlay includes a plurality of apertures adjacent said pressure transducers.

16. The nose cone assembly as set forth in claim 13, wherein said self-contained overlay is a wireless self-contained overlay wherein said overlay comprises epoxy glass laminated on epoxy syntactic foam.

17. The nose cone assembly as set forth in claim 15, wherein pressure transducers comprise piezoresistive differential pressure transducers.

18. The nose cone assembly as set forth in claim 15, wherein said mounting means comprises a pressure sensitive adhesive.

19. A method of determining air data quantities such as pressure, angle of attack and side slip experienced by an aircraft during flight, comprising the steps of:
   providing a self-contained and removable nose cone assembly for mounting to a nose cone of an aircraft, said assembly having means for sensing and transmitting said air data quantities;
   providing a CPU located remotely from said assembly for receiving and analyzing transmitted air quantities;
   mounting said assembly to a nose cone of an aircraft;
   collecting said air quantity data;
   transmitting collected data to said CPU; and
   determining said air quantities.

20. The method as set forth in claim 19, wherein said step of transmitting is wireless transmission.

* * * * *